United States Patent [19]

Hammons

[11] Patent Number: 4,645,230
[45] Date of Patent: Feb. 24, 1987

[54] COLLAPSIBLE TRAILER

[76] Inventor: Robert E. Hammons, R.D. 1, Box 176, Dan Main Rd., Norwich, N.Y. 13815

[21] Appl. No.: 561,244

[22] Filed: Dec. 13, 1983

[51] Int. Cl.$^4$ .............................................. B62D 63/06
[52] U.S. Cl. ......................................... 280/656; 16/20; 280/78; 280/460 R; 280/491 A
[58] Field of Search ............... 280/656, 491 R, 491 A, 280/491 B, 482, 460 R, 78; 16/30, 44, 20, 48; 296/181, 27

[56] References Cited

U.S. PATENT DOCUMENTS

| | | | |
|---|---|---|---|
| 1,828,684 | 10/1931 | Scarlett | 296/27 |
| 1,968,046 | 7/1934 | Linn | 280/78 |
| 2,027,127 | 1/1936 | Tastenhoye | 280/78 |
| 2,033,298 | 3/1936 | Pribil | 280/78 |
| 2,057,655 | 10/1936 | Anthony et al. | 280/78 |
| 2,113,448 | 4/1938 | Hewitt | 280/764.1 |
| 2,468,627 | 4/1949 | Hamilton | 16/44 |
| 2,564,996 | 8/1951 | Rasbach | 16/44 |
| 2,826,425 | 3/1958 | Hoeper | 280/78 |
| 2,834,632 | 5/1958 | Mattox | 296/27 |
| 2,876,036 | 3/1959 | Olson | 280/482 |
| 3,482,850 | 12/1969 | Fay | 280/78 |
| 3,784,230 | 1/1974 | Worrall, Jr. | 280/78 |
| 3,877,714 | 4/1975 | Black | 280/78 |
| 3,917,316 | 11/1975 | Furnish | 296/27 |
| 4,078,821 | 3/1978 | Kitterman | 280/78 |
| 4,372,569 | 2/1983 | Otterson | 280/78 |
| 4,515,394 | 5/1985 | Zwick | 280/764.1 |
| 4,529,220 | 7/1985 | Wright | 280/656 |

FOREIGN PATENT DOCUMENTS 294955  9/1967  Australia ................................ 16/20

Primary Examiner—David M. Mitchell
Attorney, Agent, or Firm—Charles W. Fallow; Martin P. Hoffman

[57] ABSTRACT

The collapsible trailer described herein has a top adapted to mate with the upper edges of removable end and side wall panels. When the trailer is collapsed, the top mates directly with the bed of the trailer, thus forming a storage container for the wall panels. In addition, a readily removable wheel assembly is provided. The wheel normally is pivotable, but can be locked against pivoting when desired.

6 Claims, 7 Drawing Figures

COLLAPSIBLE TRAILER

BACKGROUND OF THE INVENTION

This invention relates to an automotive type utility trailer which when disassembled forms its own storage container.

It sometimes becomes necessary to transport with the family automobile more cargo than that automobile was designed to carry, and upon these occasions one must either resort to overloading the vehicle or using some type of auxiliary cargo carrier designed for an automobile. The first alternative produces scenes which have become an American caricature: the sedan fairly bursting with children and camping equipment with the driver pressed against the steering wheel. The inconvenience and danger of this mode of travel scarcely needs to be commented upon. As a result, the production of auxiliary cargo carriers is an active industry and it is that industry to which this invention is addressed.

Two popular types of auxiliary auto carriers are tow behind utility trailers and rooftop carriers. Rooftop carriers are attractive in some respects; for example, they do not alter vehicle length or affect driver vision and once in place, they require little attention. Furthermore, they do not interfere with vehicle backing and do not appreciably affect "feel". As a result this type of carrier has enjoyed considerable commercial success; however autotop carriers have certain notorious shortcomings. Chief among these is they dramatically increase the height of the vehicle and hence its frontal area which at highway speeds results in dramatic increases in aerodynamic drag and fuel consumption. A second shortcoming is that the greatly increased height of the vehicle may make it unable to enter commercial or residential parking garages without first removing the carrier. Another factor is that placement of luggage so high on the vehicle can in some instances result in a dangerously high center of gravity.

It will be appreciated that the adverse affects of cartop carriers are amplified when applied to modern, lightweight vehicles designed particularly for fuel economy objectives.

It is now therefore appropriate to focus attention on utility trailers. Recognizing that a major drawback of many travelers is the amount of garage space they consume, this invention has been made with a view to reducing trailer storage size. In fact, a primary object of the invention is to provide a collapsible trailer that can be readily moved through doors and the like, and is capable of storage almost anywhere—in a closet, for example, or even in the trunk of the automobile.

A second object is to provide a collapsible trailer which forms its own storage container when disassembled.

Another object is to construct a collapsible trailer with a high expansion ratio, that is, very compact when collapsed yet robust and capable of accepting a large volume payload when fully assembled.

Small utility trailers having a single yoke with a ball-type hitch are notoriously difficult to back up without "jacknifing". Accordingly, a further object is to provide the public a utility trailer capable of pivoting around a transverse horizontal axis with respect to its towing vehicle, yet incapable of relative motion around a vertical axis. This restraint absolutely prevents jacknifing when backing up, and results in a more drivable trailer less susceptible to being injured by its own towing vehicle.

Still another object is to produce a utility trailer having improved stability, yet greater mobility, when separated from its towing vehicle, such as easy manipulation in wheelbarrow fashion.

The invention is embodied in a trailer having a bed and removable peripheral walls capped by a removable top, wherein the walls and other parts of the trailer can be removed and stored within a container formed by the trailer bed and the top alone. The top is capable of mating with either the upper edges of the trailer walls or with the bed itself, in order to provide alternative expanded and collapsed modes.

DESCRIPTION OF THE PREFERRED EMBODIMENT

Figure 1:
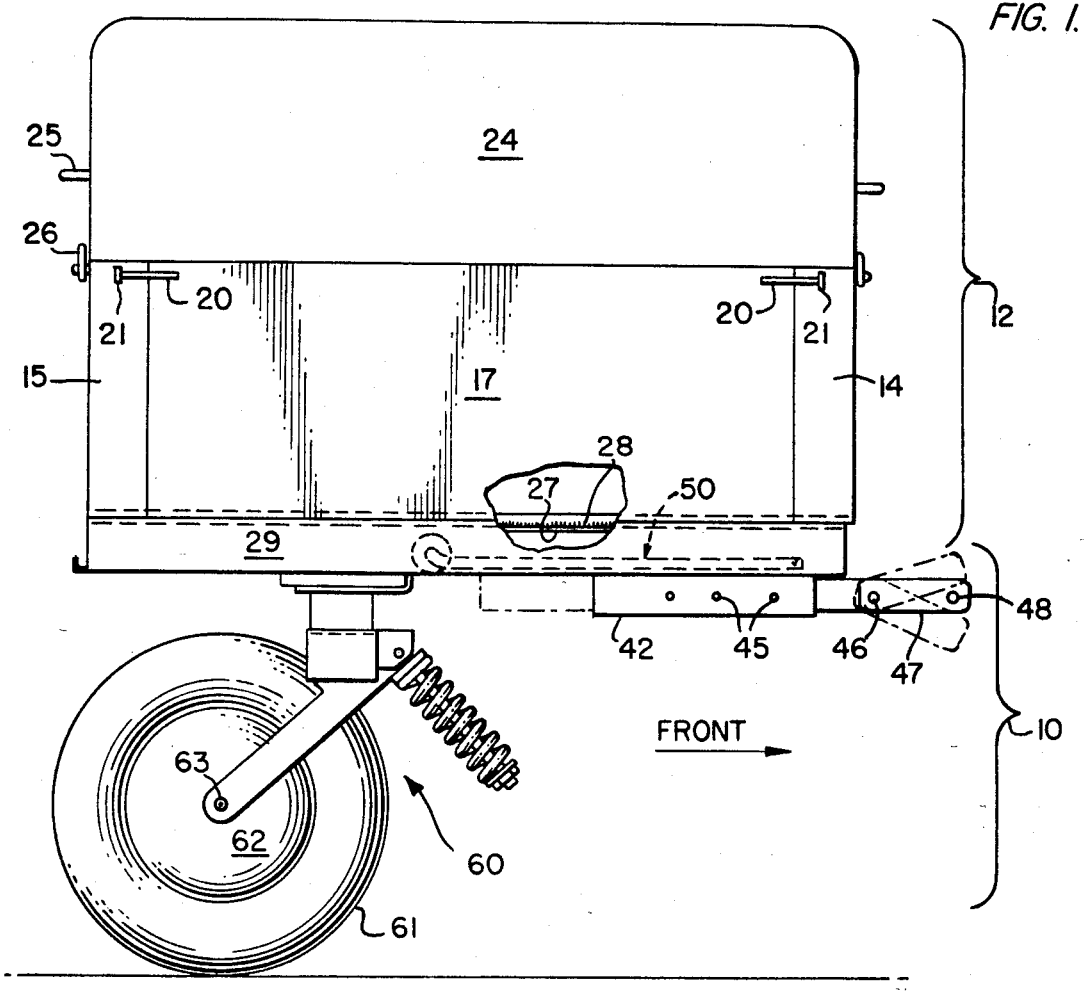
FIG. 1 is a side elevation of a trailer embodying the invention, fully assembled.
Figure 2:
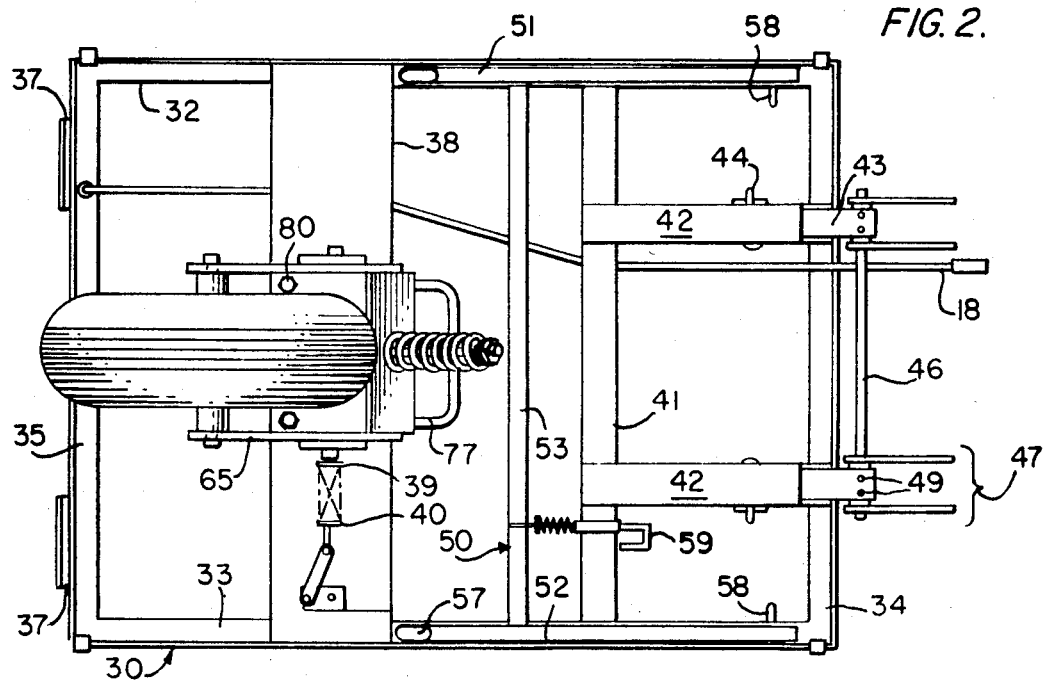
FIG. 2 is a bottom view of the structure shown in FIG. 1.

As shown in FIG. 1, a collapsible trailer embodying the invention includes a substructure designated generally by the bracket 10, and a superstructure designated 12. The superstructure includes front and rear wall panels 14 and 15 and a pair of side wall panels, one of which, 17, is shown. The rear panel 15 supports the trailer's running lights (not shown), which are electrically connected to the towing vehicle by a cable 18 (FIG. 2). The panels are interconnected at their corners by fasteners 20 which include spring clip assemblies 21 or similar attachment devices. Each spring clip assembly comprises a quarter-turn fastener having a butterfly handle, the fastener being supported by a spring ejector that causes it to disengage its receptacle automatically when the fastener is released.

The one-piece top 24 is provided with a flanged bottom edge (unnumbered) which mates with the upper edges of the assembled side and end panels and forms therewith a weatherproof seal. A pair of handles 25 are provided for ease of assembly, and conventional latches 26 secure the top 24 to the front and rear end panels 14 and 15.

The substructure of the trailer includes a bed 27 formed from a material such as sheet metal and covered with a protective layer such as carpet 28 to protect not only luggage within the trailer but also to avoid scratching of the side and end panels when they are removed and placed upon the bed as described below. The bed is provided around its periphery with sides 29 which extend approximately one inch above the bed itself, thereby providing a flange to which the wall panels, or alternatively the top 24, may be attached.

With reference now to FIG. 2, the frame 30 to which the bed 27 is attached comprises a pair of frame side rails 32, 33 interconnected by a frame front rail 34 and a frame rear rail 35. A pair of bumpers 37 are secured to the frame rear rail 35; these serve not only to protect the lights and other portions of the trailer, but also to provide a flat supporting base when the trailer, in its collapsed position, is placed on end.

Figure 6:
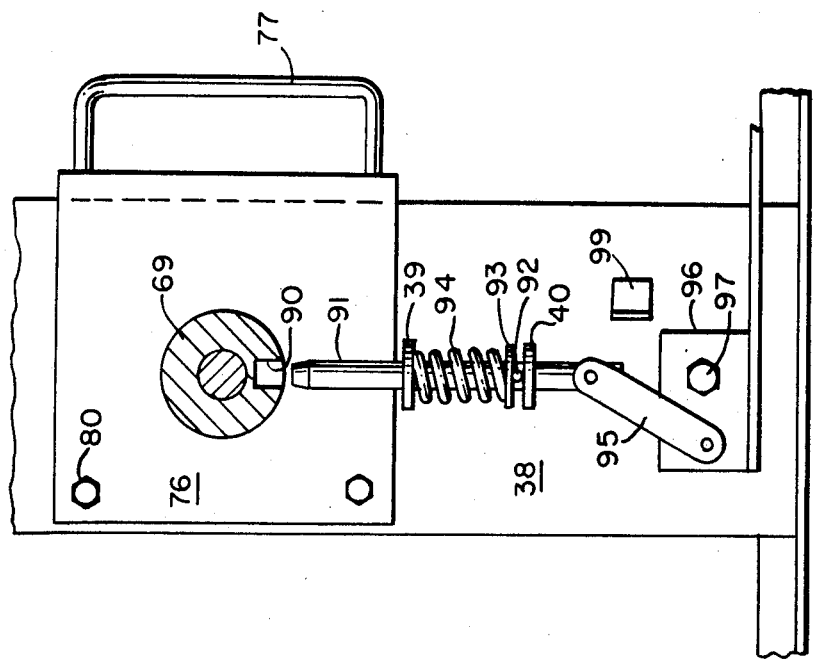
FIG. 6 is a detailed view of the wheel locking mechanism taken along the line 6—6 in FIG. 5.

A bolster 38 formed from U-channel is secured between the frame side rails 32 and 33 by a weld or similar means as illustrated in FIG. 2. Lockpin guides 39 and 40 are welded to and protrude downward from the bolster on one side of the wheel assembly 60 (FIG. 6). A cross brace 41 is connected between the frame side rails 32 and 33 substantially parallel to the bolster 38 but closer to the front of the trailer. This cross brace serves to support the rear ends of a pair of hitch tubes 42 which may be welded to both the cross brace 41 and the frame front rail 34. Each of the hitch tongues 43 is capable of telescopic movement with respect to its tube 42 owing to the provision of several holes 45 (see FIG. 1) through which quick-disconnect hitch pins 44 can be placed. A pivot rod 46 extends through the ends of both of the tongues 43 thereby assuring that they are extended equally and providing a measure of safety against loss of one of the pins 44. A pair of hitch links 47 are joined to the pivot rod 46, one link being on either side of each tongue. A hole 48 (FIG. 1) at the forward end of each link provides a means by which the trailer may be connected to a vehicle. As suggested by the broken lines in FIG. 1, the links may be moved up or down to adjust trailer attitude, then secured in the desired position by inserting pins 49 through holes provided in the pivot rod 46 and the tongues 43.

Figure 3:
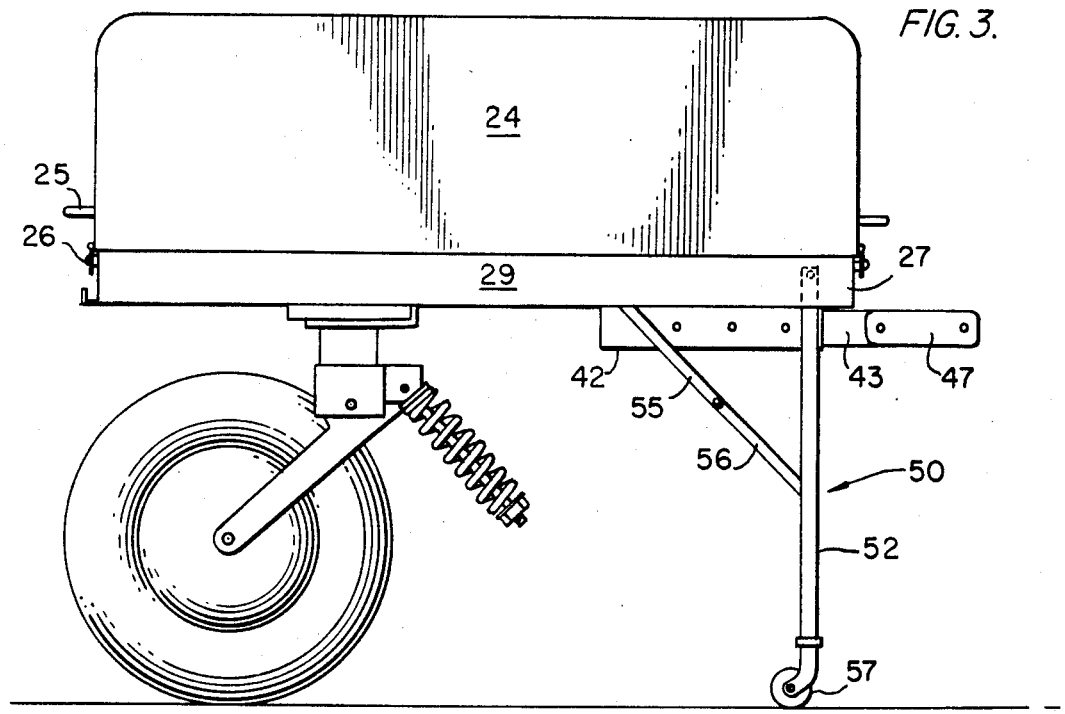
FIG. 3 is a side elevation similar to FIG. 1 but showing the trailer in its collapsed configuration with ground supports extended.

FIG. 3 shows the trailer in a partially collapsed configuration with its wheel assembly 60 still in place and its ground support assembly 50 lowered (compare FIG. 1). As FIGS. 2 and 3 show, this assembly includes a pair of struts 51 and 52 interconnected by a horizontal brace 53. The struts are pivotally attached to the frame side rails 32 and 33 at a point near the front of the trailer. When lowered, they are maintained in position by means of a well known over-center type diagonal brace comprising two links 55 and 56. The lower end of each strut is provided with a caster 57 preferably made of rubber or the like for quiet movement. When lowered by release of a spring-loaded latch 59 which is located between cross brace 41 and horizontal brace 53, the castered struts provide stability for the trailer, and allow it to be maneuvered as desired, even by hand. In FIG. 2, retaining bolts 58 are shown which secure the ground support struts against the bottom of the bed 27 and allow pivotal movement of the ground support assembly 50. When lowered, the diagonal braces previously referred to limit the forward motion of the struts.

Figure 5:
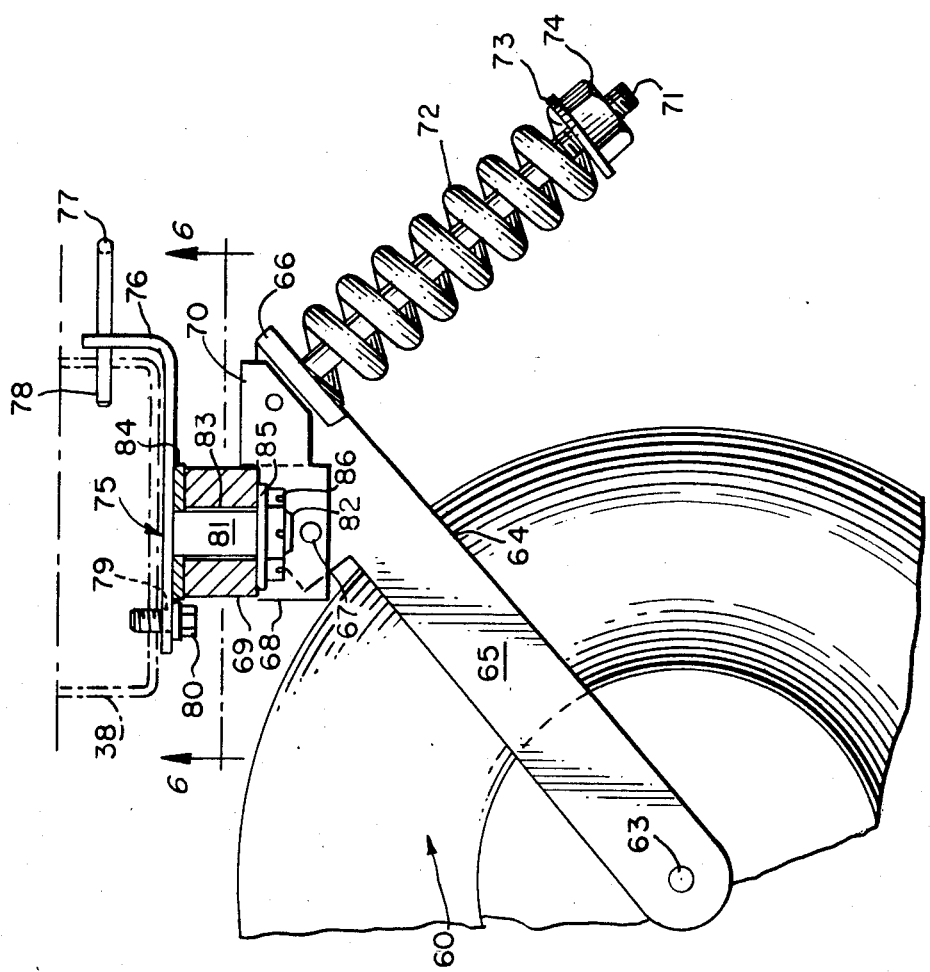
FIG. 5 is a side elevation of the removable wheel assembly.

Attention is now directed to FIG. 5 showing the removable wheel assembly 60, separate from the trailer, portions of which are illustrated by broken lines. The wheel assembly includes a tire 61 mounted on a wheel 62 which is journaled on axle 63, the ends of which are attached to a suspension fork 64 comprising a pair of spaced arms 65 (one on either side of the wheel) interconnected at their upper ends by a spring bearing plate 66. The suspension fork 64 is connected by a pin 67 to the yoke plate 68 of a trunnion assembly 69 which is capable of rotation around a vertical axis through a kingpin 81. The trunnion assembly includes a pair of ears 70 which pivotally support the upper end of a retainer rod 71 that is surrounded by a coil spring 72 as shown. The spring is adjustably maintained in compression against the bearing plate 66 by means of a spring retainer 73 and a nut 74 threaded onto the lower end of the rod.

The kingpin assembly designated generally 75 includes an L-shaped bracket 76 having a U-shaped handle 77 welded thereto, with the ends of the handle projecting through the bracket providing a pair of locating dowels 78. The forward end of the bracket 76 has a pair of holes 79 through which bolts 80 may be inserted to hold the wheel assembly securely to the bolster 38. A kingpin 81 extends vertically downward from the bracket 76, terminating at a threaded end 82. The trunnion assembly 69 is retained on the kingpin, with a radial bearing 83 and a friction-type thrust bearing 84 therebetween, by means of a washer 85 and a pinned castle nut 86 as illustrated. The bearing 84 may be of a bronze oil-impregnated center-bearing type; whereas washer 85 may be a spring washer such as Belleville washer which serves as an adjustable friction mechanism for anti-oscillation or wobble control.

It will be appreciated that the wheel assembly comprises a single unit which when removed from the trailer can be manipulated by means of the handle 77 and which can be readily installed on the trailer simply by placing the dowels 78 into mating holes provided on the bolster 38, then inserting and tightening the bolts 80.

Ordinarily the trunnion and wheel are free to rotate around the kingpin and in fact this pivoting is necessary in view of the horizontally rigid connection of the trailer to its towing vehicle. It has been found advantageous however to provide means for preventing pivoting of the wheel with respect to the trailer when desired, particularly in order to provide stability when the trailer is disconnected from its towing vehicle, with the ground support assembly 50 lowered, or when moving the trailer around manually like a wheelbarrow. To this end a locking mechanism is provied to hold the wheel in its straight, trailing position. As shown in FIG. 6, the trunnion assembly 69 is provided with a horizontal hole 90 which may be engaged by a locking pin 91 that is reciprocably supported by the lock pin guides 39 and 40 previously described. A retaining pin 92 and an adjacent washer 93 between these guides serve to confine a compression coil spring 94 that biases the locking pin 91 away from the horizontal hole 90. The end of the locking pin is pivotally connected by a toggle link 95 to an actuator lever assembly 96 mounted by means of a bolt 97 to the bottom of the bolster 38. A stop 99 may be welded to the bottom of the bolster in such a position that when the lever 96 is rotated clockwise so as to compress the spring 94 and force the pin 91 into the hole 90, the link 95 passes center slightly before further movement is prevented by the stop 99. This assures that the wheel will remain locked until the lever is deliberately released.

Figure 7:
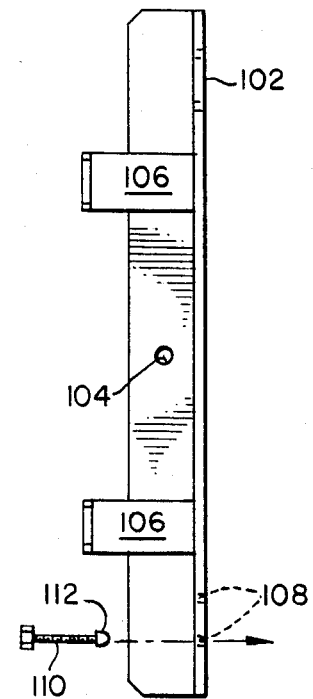
FIG. 7 is a top view of a bumper adapter for use with the subject trailer.

FIG. 7 illustrates a bumper mount designated for use with the trailer as described above. As can be seen this assembly includes an L-shaped lateral member 102 having a central mounting hole 104 designed to be bolted to a conventional trailer hitch, where the trailer ball is usually found. Extending rearwardly from the lateral member 102 are a pair of projecting members 106 having a spacing identical to that of the hitch tongues 43. The threaded holes 108 illustrated are adapted to receive bumper adjustment bolts 110 having rubber tips 112 which can abut an automobile bumper to prevent movement of the hitch assembly, without damaging the bumper itself.

Figure 4:
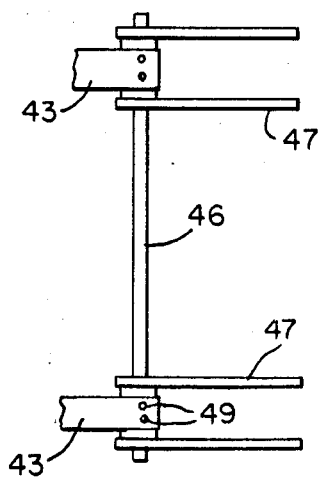
FIG. 4 illustrates the trailer hitch detail.

In use, the loaded trailer, as shown in FIG. 1, is drawn up to the rear of the towing vehicle (to which the bumper hitch assembly shown in FIG. 7 has already been attached) and the hitch links 47 are connected to the projecting members 106 (FIG. 4) of the hitch assembly by hitch pins or the like (not shown). It will be appreciated that thus attached, the trailer can rise and fall with respect to the towing vehicle as bumps and dips are encountered, but pivoting around a vertical axis—and any possibility of jacknifing—are prevented. A trunnion mounting shown in FIG. 6 enables the wheel 61 to pivot freely around a vertical axis through kingpin 81 to provide necessary trailing action.

When the destination is reached, the top is lifted from the trailer, and the cargo may be removed. Then, after releasing each fastener 20, the walls are quickly removed and may be placed upon the carpeted bed 27, whereafter the top 24 is replaced, this time engaging the side flanges 29. A convenient waterproof container, 20 with the wall panels inside, is thus formed.

If the trailer is to be removed from its towing vehicle, the ground support assembly 50 may be lowered by release of spring-loaded latch 59 which is secured between cross brace 41 and horizontal brace 53. The casters 57, with the tire 61, thus form a stable three-point support for the trailer, and enable it to be pushed about easily, even if still loaded.

To further increase stability, the wheel 61 can be easily locked in its straight trailing position by moving the actuator lever 96 so as to drive the pin 91 into the hole 90 (FIG. 6). This enables one to push the unit around, in wheelbarrow fashion, by lifting the front end of the trailer. The trailer can thus be moved about easily in or out of doors.

To minimize overall trailer size, the tongues 43 may be fully retracted into the tubes 42, and the links 47 are pivoted 180° rearward underneath the trailer, which has an overall size of only about 29×36×10 inches, exclusive of the wheel assembly.

When the trailer is ready for storage, the wheel assembly may be quickly released from the trailer by removing the retaining bolts 80, and may then be stored alongside the rest of the trailer, such as in the trunk of the vehicle.

In summary, the trailer described is extremely versatile, and may be quickly and easily set up or disassembled as desired.

Inasmuch as the foregoing description is of only one embodiment of the invention, it should not be taken as limiting the invention, whose full scope is expressed in the following claims.

I claim:

1. A collapsible utility trailer comprising
 a trailer frame,
 a bed affixed to said frame,
 a plurality of wall panels removably attachable to said bed,
 a top removably connectable either to said panels when attached to said bed, or to the bed itself when said panels are removed thereby forming a storage container for said panels,
 a pivotable wheel assembly connectable to said frame,
 said wheel assembly being readily removable from said trailer frame,
 wherein said assembly comprises
  a kingpin assembly including a mounting bracket and a kingpin attached thereto,
  a trunnion journaled on said kingpin,
  a suspension fork pivotally connected to said trunnion,
  means for biasing said fork with respect to said trunnion, and
  a wheel rotatably attached to a lower end of said fork,
 said bracket having a carrying handle attached thereto and at least one dowel pin means extending therefrom for locating said bracket upon said frame.

2. A trailer as recited in claim 1 wherein
 said frame includes a laterally extending bolster, and
 said kingpin bracket generally conforms in shape to said bolster,
 said bolster having a hole for receiving said dowel pin means,
 said bolster and said bracket further having holes adapted to receive at least one means for securing said bracket to said frame.

3. A trailer as recited in claim 1 wherein said frame includes at least one bumper at the rear thereof to protect the trailer, said bumper having a planar vertical rear surface to provide a stable rest when the collapsed trailer is stored on end.

4. A trailer as recited in claim 1 further comprising a wheel pivot locking mechanism for locking the trunnion and aligning the trailer wheel in a straight trailing position.

5. A trailer as recited in claim 4 wherein the wheel pivot locking mechanism includes
 a locking pin means movable toward and away from said trunnion,
 means for biasing said locking pin means away from the trunnion,
 a lever mounted with said frame for rotation about an axis parallel to the kingpin, and
 a toggle link interconnecting said lever and said locking pin means,
 said trunnion having a hole for receiving the locking pin means, said hole being in such a position that when the trunnion is locked, the trailer wheel is aligned in a straight trailing position.

6. A trailer as recited in claim 1 further comprising a hitch assembly comprising
 a pair of tubes attached at the forward end of said trailer frame,
 a pair of tongues telescopically contained within said tubes and extending forward from the trailer,
 a lateral rod means interconnecting said tongues,
 a pair of hitch links attached to the forward end of each tongue,
 said links being capable of pivoting a full 180° backward from their operational position to a stowed position, and
 means for securing said links in either said operational or said stowed position.

* * * * *